Sept. 30, 1958     E. SCHLUETER     2,853,751
LINK LOCK FASTENER
Filed Feb. 5, 1952     3 Sheets-Sheet 1
FIG. 1.
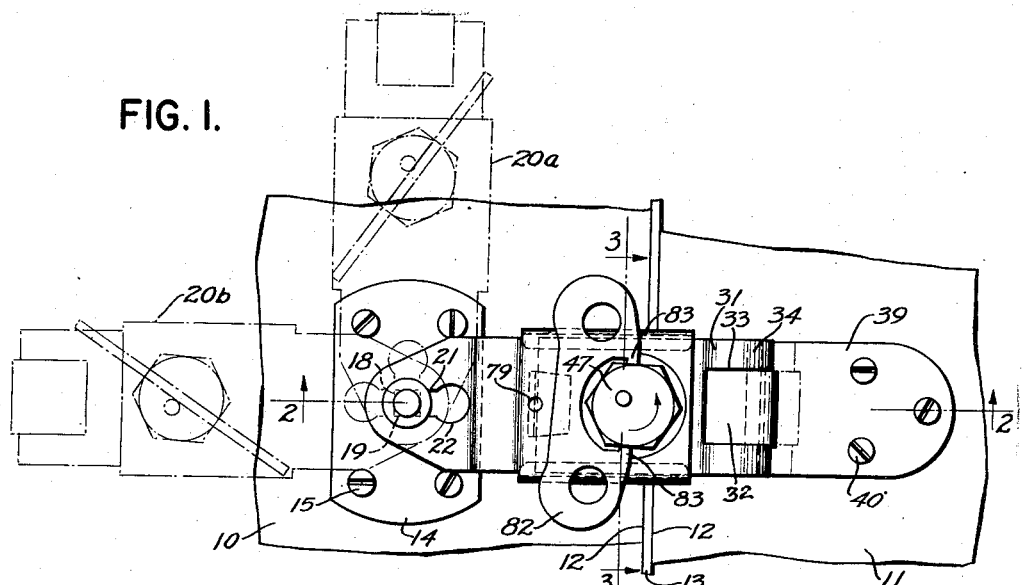
FIG. 2.
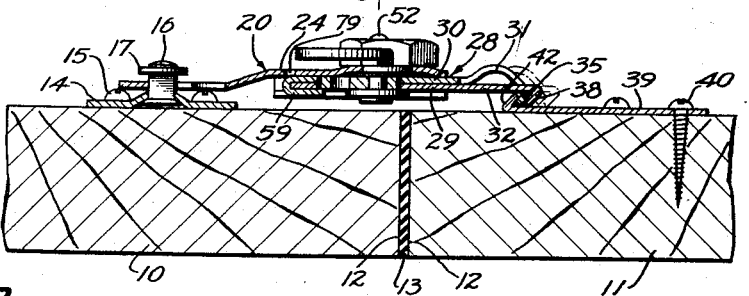
FIG. 3.
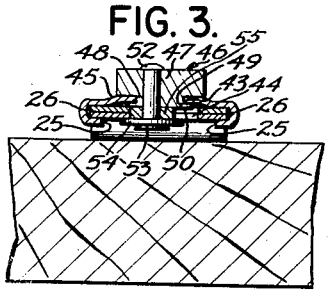
FIG. 4.
FIG. 5.
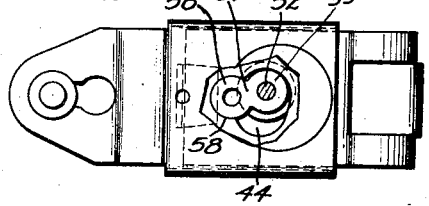
FIG. 9a.
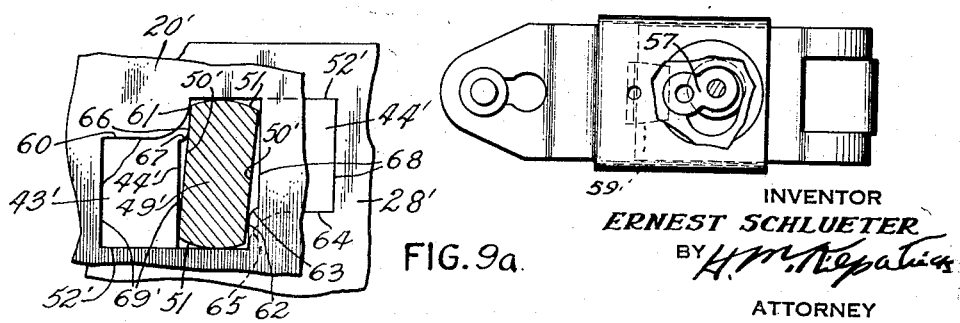
INVENTOR
ERNEST SCHLUETER
BY H. M. Kilpatrick
ATTORNEY Sept. 30, 1958 E. SCHLUETER 2,853,751
LINK LOCK FASTENER
Filed Feb. 5, 1952 3 Sheets-Sheet 2

INVENTOR
ERNEST SCHLUETER
BY
ATTORNEY

Sept. 30, 1958 E. SCHLUETER 2,853,751
LINK LOCK FASTENER
Filed Feb. 5, 1952 3 Sheets-Sheet 3

INVENTOR
ERNEST SCHLUETER
BY
ATTORNEY

United States Patent Office 2,853,751
Patented Sept. 30, 1958

2,853,751

LINK LOCK FASTENER

Ernest Schlueter, Troy, N. Y., assignor to Simmons Fastener Corporation, Albany, N. Y., a corporation of New York Application February 5, 1952, Serial No. 269,940

7 Claims. (Cl. 20—92)

This invention relates to fastening devices and fasteners and to means for fastening together adjacent structures and more particularly to devices for locking or fastening together adjacent panels of portable houses, large packing cases, trunks or the like, though it is noted that in many of the claims the invention is not limited to securing panels.

Objects of the invention are to provide improved very strong fastening devices of this kind which may be quickly operated to reliably secure two structures together, and which will unyieldably or automatically yieldably draw the structures together and which will accommodate inaccuracies and misalinement when bringing the structures together.

Other objects of the invention are to provide an improved device of this kind having a minimum of parts and which will maintain the fastening stress at the midplane of the panel.

Additional objects of the invention are to effect simplicity and efficiency in such fasteners and to provide an extremely simple device of this kind which is convenient, speedy, durable, and reliable in operation, and economical to manufacture and install.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

The inventive features for the accomplishment of these and other objects are shown herein in connection with a link-type fastener or lock for securing together panels meeting in a butt joint. Said fastener comprises a hasp member pivoted on a pivot pin mounted on one panel, and a slide member telescopically slidable on the inner face of the hasp member and provided with a free end hook adapted to engage a keeper plate secured on the other panel and having a lip with which said hook may lock and unlock when the slide member telescopes. Said members are provided with partially registering openings in which are disposed a partially rotary bolt having an outer end head and carrying an intermediate part rotary in said openings and parts engageable with edges of the opening of the slide member and movable to locking position to draw the members together to a locking position and movable to another position to extend the slide member to unlocking position.

In some forms of the invention, the keeper plate and a plate carrying the pivot pin are secured on the panels by screws. In another form such plates are provided with posts or pegs engageable in bores of the panels. In still another form such posts or pegs are formed on the hasp and slide members themselves.

In the accompanying drawing showing, by way of example, several of many possible embodiments of the invention, Fig. 1 is a fragmental elevation showing one form of the fastener applied to two structures;

Fig. 2 is a sectional view taken on the line 2—2 of Fig. 1;

Fig. 3 is a sectional view taken on the line 3—3 of Fig. 1;

Figs. 4 and 5 are front elevations partly broken away and partly in section showing two positions of parts of the form of invention of Fig. 1;

Figure 6:
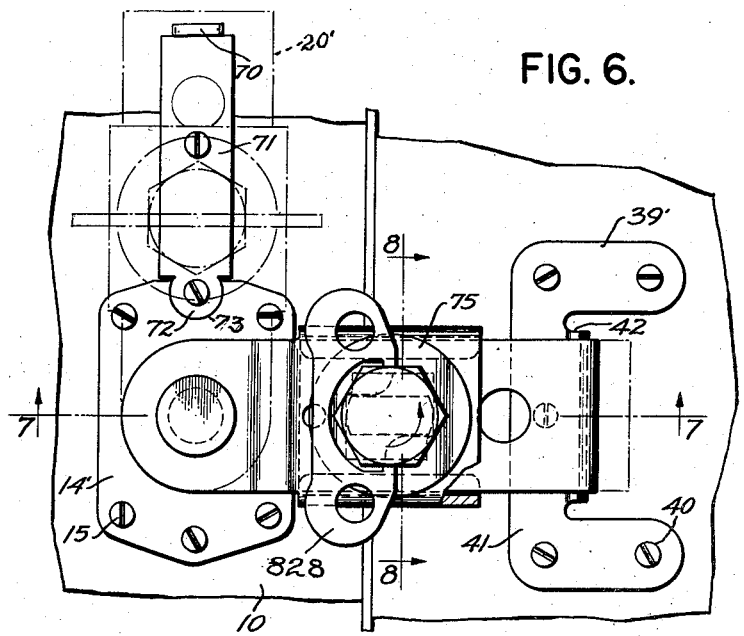
Fig. 6 is a fragmental front elevation showing another form of the fastener.
Figure 7:
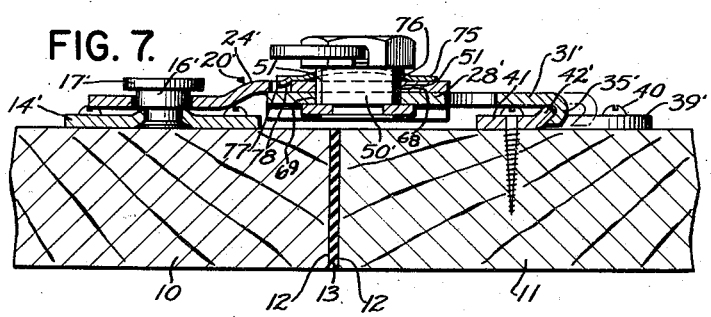
Figure 8:
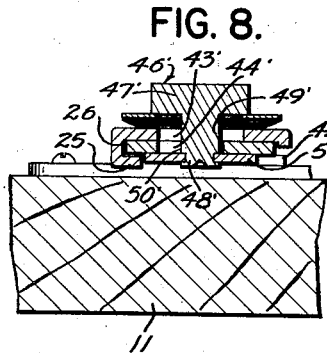
Figure 9:
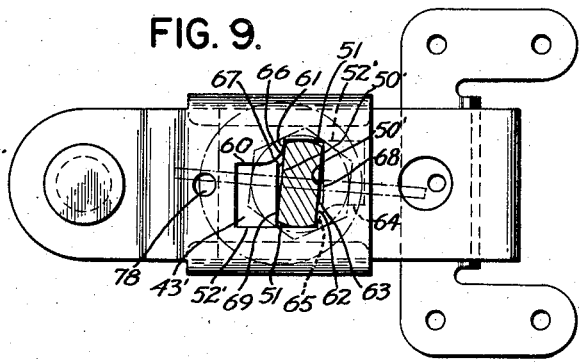
Figure 10:
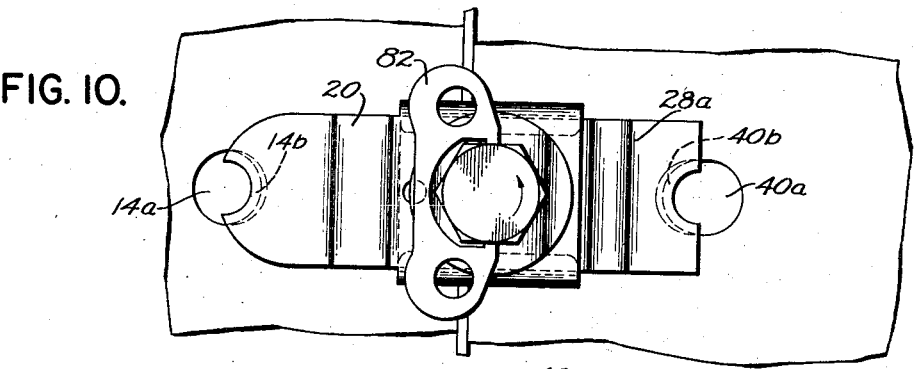
Figure 11:
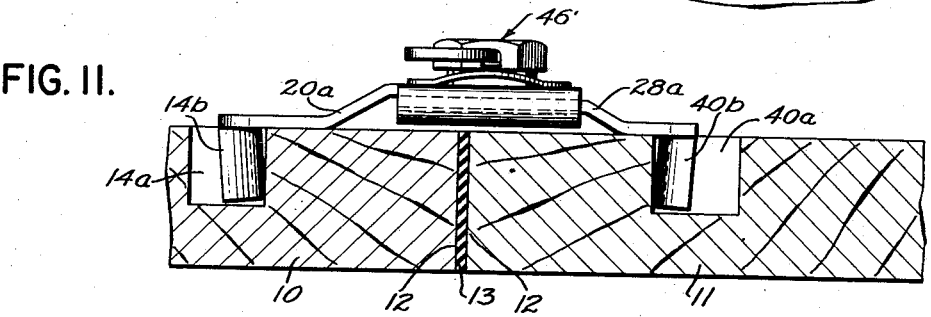
Figure 12:
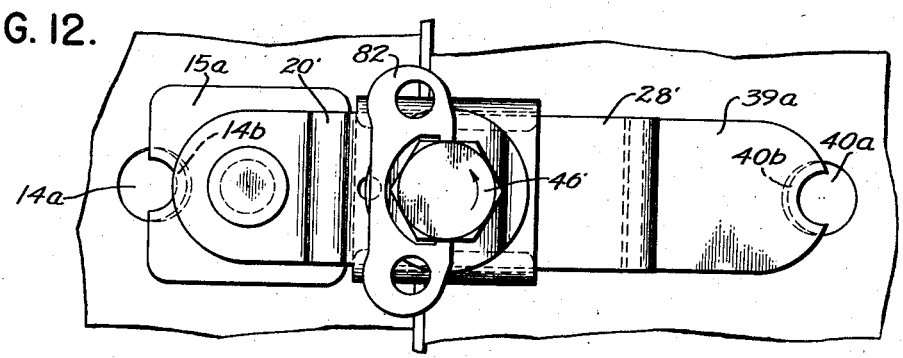
Figure 13:
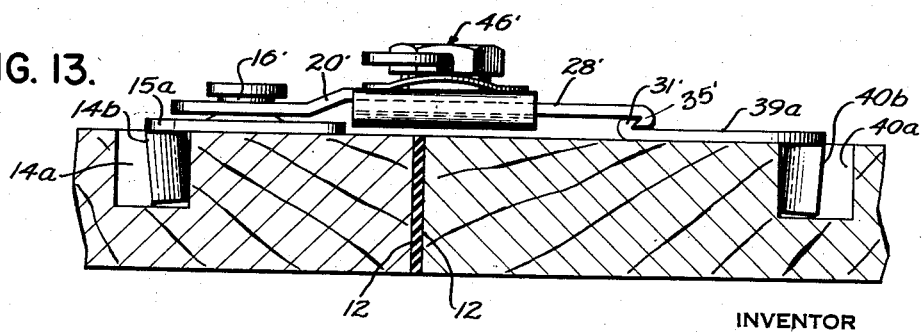

Figs. 7 and 8 show sections taken on the lines 7—7 and 8—8 respectively of Fig. 6;

Fig. 9 is a front elevation partly in section of the fastener of Fig. 6;

Fig. 9a is an enlarged front elevation of a fragment of the fastener as shown in Fig. 9;

Figs. 10 and 12 are front elevations respectively showing modifications of the fastener of Fig. 6; and Figs. 11 and 13 show longitudinal sections of said modifications respectively.

My improved fastener as in Figs. 1 to 5 is suitable for fastening together elements of portable houses, packing cases and other structures such as pair of thick panels 10, 11 disposed in the same plane and meeting in a butt-joint having butt-faces 12 perpendicular to said plane and having a gasket 13 compressed therebetween. An approximately rectangular pivot-carrying plate 14 is secured by screws 15 fast to the face of one panel near the joint and has side edges respectively parallel and approximately perpendicular to the joint faces and supports a pivot pin 16 of square cross section riveted or otherwise mounted fast centrally of said plate and having a washer 17 secured thereon forming a head spaced from the plate, the edges 18, 19 of said cross section being respectively parallel and perpendicular to the planes of said butt faces 12.

An approximately flat elongated pivoted hasp member 20 has at its pivot end a longitudinally disposed substantially keyhole-shaped slot 21, 22 receiving said pin 16 and comprising an elongated rectangular part 21 adjacent to said end having its sides spaced apart a distance substantially equal to the narrowest diameters of the pin and adapted to slidably receive the pin, and a round part 22 at the end of the rectangular part most remote from said end of the hasp and of longer diameter than the longest diameter of the pin, whereby when said round part receives the pin, the hasp may be swung to inclined positions or substantially to positions 20a or 20b substantially parallel or perpendicular to said butt faces and moved to cause the pin 16 to be received in said rectangular part 21 to hold the hasp from angular movement or from projection or injury during shipping or assembly of the panels.

Said hasp member is provided beyond said plate on the free end part of the member with an off-set part 24 (Fig. 2) off-set slightly away from the panels and having backwardly and inwardly turned side edge flanges 25 (Fig. 3) forming guide ways 26 extending across the butt-joint.

A flat slide member 28 (Fig. 2) comprising superposed slightly yieldable spring plates 29, 30 lying flat against each other and the inner face of said free end part of the hasp member has registering side edges, telescopically slidable in said guide ways 26, said flanges 25 forming the guide ways 26 constituting means for holding said members 20 and 28 against any transverse, rotary or pivotal movement in any direction relative to each other in all relative positions. Said plates have projecting end portions 31, 32, the projecting portion 31 of the outer plate 30 being provided with a rectangular intramarginal cut-out 33 (Fig. 1) to form a marginal spring frame 34, 35 the sides 34 of the frame being intermediately curved away from the adjacent panel, the free end margin of the spring frame being bent toward said joint to form a wide yieldable hook 35. The projecting part 32 of the inner plate 29 comprises a tongue 32 narrower than and partly in said cut-out 33 and overlapping said wide hook 35 and provided with a hooked end 38 pointing toward the end faces 12 and normally, when unlocked, slightly spaced from the outer face of the wide hook 35 somewhat between the wide hook and adjacent panel 11.

An approximately rectangular keeper plate 39 secured by screws 40 on the panel 11 has its margin nearest said hasp member inclined in a direction away from the panels and hasp member to form a keeper lip 42 which said wide hook 35 may engage when the slide member 28 telescopes to an inner locking position in said ways, and which said hook may clear when the slide member 28 moves in said ways 26 to an outer unlocking position.

Said members 20 and 28 are provided midway between said guide ways with partially registering openings 43, 44 (Fig. 3), the opening 43 in the hasp member being round and surrounded by a slightly raised portion 45 and receiving an eccentric-carrying bolt 46 having an outer head 47 engaging said portion 45, a reduced inner end 48 partially rotary in said round opening and having a flat inner end face 49 perpendicular to its axis and substantially flush with the inner face of the hasp member. Said flat face 49 is shown provided with a flange 50 engaging the inner face of said raised portion 45, but this flange may be omitted if desired.

An eccentric pin 52 fast in said bolt and projecting from said flat end face 49 has an outer head engaging the bolt head and an inner head 53 forming a shoulder nearly flush with the inner face of the inner plate. A washer 54 on said pin against the inner head 53 and larger than said openings engages said inner plate 29 and serves to hold the bolt in the openings if the flange 50 is omitted. A short flat link 55 (Fig. 4) in said opening 44 of the slide member 28 is pivoted on the eccentric pin 52 and has an approximately complete circular end 56 and a short narrow neck 57 connecting the circular end with the pivoted end. The opening 44 of the slide member has a partly closed partly circular part 58 near the inner end of the slide member and opening toward the pivot pin and pivotally receiving said circular end 56. The opening 44 is formed large enough to allow the eccentric pin 52 to move from dead center to dead center and slightly beyond, and to stop the pin when it moves slightly beyond the dead center. The eccentric pin is such distance from the axis of the bolt 46 and the keeper lip 42, that when the bolt is turned in the direction of the arrow of Fig. 1 the eccentric pin moves to a position nearest said keeper lip 42, said hook may then clear the keeper lip, and when the bolt is turned in the direction opposite to the arrow of Fig. 1 said eccentric pin becomes disposed at the dead center most remote from the keeper lip, said hooked end 38 tightly engages the hook 35 and the hook 35 tightly engages the keeper lip 42 to force the panels together.

The inner end of the outer plate 30 is provided with a tongue 59 bent over and against the edge of the lower plate 29 and the adjacent part of said circular part 58 of the opening 44 in the slide member, to hold the inner edges of the superposed plates 29, 30 substantially in registry, and to hold the circular part 56 of the link in said circular part of the opening. The hasp member 20 is provided with a peep hole 79 through which the inner end edge of the slide member 28 is visible when in locking position, and through which said slide member is not visible when in unlocking position, to give a visual indication of slide member position. And a butterfly 82 has inturned pivot journals 83 pivotally received in bores at diametrically opposite sides of the bolt head 47, whereby the butterfly may be disposed diametrically of the bolt or against the hasp member, thus adapting the bolt to be turned by hand or wrench.

My improved fastener of Figs. 6 to 9 is shown in combination with a pair of thick panels 10, 11 disposed in the same plane and meeting in a butt-joint having buttfaces in perpendicular to said plane and having a gasket 13 adapted to be compressed therebetween. An approximately rectangular pivot-carrying plate 14' secured by screws 15 fast to a wide face of one panel, carries a headed pivot 16' riveted or otherwise mounted fast centrally of said plate and having its head 17' spaced from the plate.

A flat hasp member 20' pivoted on said pin for movement parallel to said plane is provided beyond said plate with a free end offset part 24', offset slightly away from the panels and having rearwardly and inwardly turned side edge flanges 25 (Fig. 8) forming guide ways 26 extending across the joint and adapted to receive a flat slide member 28' lying flat against the inner face of said free end part 24' and having its edges slidable in said guide ways 26 and having a projecting end portion 31' having its free end margin bent inwardly somewhat toward said joint to form a wide hook 35' adapted to engage a U-shaped keeper plate 39' secured by screws 40 on the panel 11 and having a yoke part 41 parallel to said joint and having its margin remote from said members to form a lip 42' which said wide hook 35' may engage when the slide member telescopes to an inner locking position in said ways, said wide hook being adapted to clear the lip 42' when the slide member 28' moves in said ways to an outer unlocking position.

Said members are provided midway between said guide ways with partially square partially registering openings having partially registering side edges, and end edges partially registering when the slides are in locking position. A cam bolt 46' disposed in said openings, has an outer head 47', a reduced inner end 48', and an intermediate cam body 49' of transversely elongated cross section providing flat sides 50' and a maximum diameter part equal in diameter to the maximum transverse and longitudinal dimensions of said openings and having rounded end faces 51 (Fig. 9) coaxial with the bolt and engageable with side edges 52' of the openings when the cam body is in transverse unlocking position allowing the flat sides of the body to engage end edges of the openings. Rotation of the bolt in the direction of the arrow of Fig. 6 causes the rounded end faces 51 to engage the end edges 68, 69 as in Fig. 7, thus forces the end edges to register, drawing the slide member inwardly to locking position to cause the hook 35' to engage the lip 42'.

A washer 54' in said reduced end 48' larger than said openings engages said slide member 28' to hold the bolt in the openings.

The opening 43' in the hasp member 20' is formed near respective diagonally opposite corners with deep shoulders 60, 61 (Fig. 9) and shallow shoulders 62, 63 disposed at substantially right angles to each other. The opening 44' in the slide member 28' is formed with similar deep shoulders 64, 65 and shallow shoulders 66 and 67. The shoulders 61 and 62 engage flat sides of the cam body to limit its movement when the body is in transverse unlocking position and shoulders 60 and 63 limit movement of the body in longitudinal locking position as in Fig. 7. The deep shoulders of each member are adjacent to the shallow shoulders of the other member and merge with each other in a rounded edge. The shoulders 61 and 65 serve as cam shoulders engageable by the flat sides of the cam body when moved to transverse position to extend the slide member to unlocking position.

The outer edge 68 of the hasp member opening 43 and the inner end edge 69 of the slide member opening 44 are engaged by the rounded end faces 51 as in Fig. 7 when the cam body 49 is moved to longitudinal position, thus to draw the hook 35 firmly against the keeper lip 42.

When in unlocking position, the assembly of the members 20', 28' may be pivotally moved on said pivot pin 16' to the dotted line position of Fig. 6 at right angles to their locking position where the wide hook may engage the frontwardly turned end 70 of a bracket bar 71 secured to the panel 10 and having a rounded end 72 fitted in a partly circular recess 73 in the plate 14, the bar being secured flat on the panel 10 and having said frontwardly turned end 70 the same distance from the pivot pin 16 as said lip 31 whereby said wide hook may be locked on the turned end 70 to hold the members from movement during shipping, storing and assembly of the panels. A curved spring washer 75 on said bolt between the hasp member and the bolt head has an elongated central opening 76 (Fig. 7) snugly receiving said cam body 49 and is provided wtih an identation 77 engageable in a depression 78 in the hasp member to yieldably hold the bolt from rotation when the longest central diameter of the cam body is longitudinal of said members. A butterfly 82 has inturned pivot journals 83 pivotally received in bores at diametrically opposite sides of the bolt 47 and may be disposed diametrically of the bolt or against the hasp member, thus adapting the bolt to be turned by hand or wrench.

In the forms of invention of Figs. 10 to 13 the bores 14a, 14b near said gasket 13 extend from the faces of the panels to somewhat past the mid plane of the panel. In Figs. 12 and 13 the outer ends of the pivot and keeper plates 15a, 39a on said panels are formed with approximately tubular posts 14b, 40b disposed in said bores respectively and extending to said mid plane and being inclined toward and having rounded faces faced toward the faces 12. The hasp member 20' is pivoted on the pivot plate 15a, slide members 28' being telescopically slidable on the hasp member, provided with an end hook 35 engageable with the lip 31' on the keeper plate 29a and the means including the bolt 46' carried by said members for drawing the members telescopically together to locking position and holding them in locking position are the same as in Figs. 1 to 5 or as in Figs. 6 to 9.

In the form of invention of Figs. 12 and 13, the posts 14b and 40b are formed directly on the hasp member 20a and slide member 28a.

The inclination of the posts causes the posts to bear against the bore wall substantially only at the mid plane of the panels, thus tending to maintain the panels in alinement, and maintaining the stress of the posts on the panels remote from the face of the panel to avoid rupture of the panel faces at the month of the bores.

If desired, the pivot pin 16 of square cross-section of Fig. 1 may be used with the structures of Figs. 6 to 9, 12 and 13; eccentric pin and link structure of Fig. 1 may be used with the structures of Figs. 6 to 13; the spring hook structure of Fig. 1 may be used with the structures of Figs. 6 to 9, 12 and 13; the partially square openings 43', 44' or the simple hook 35' or the bracket 71 of Fig. 6 may be used with the structure of Fig. 1; the posts of Figs. 10 to 13 may be used with any of the other structures herein, and the washer 75 of Fig. 7, may be used with the structures of Figs. 1 to 5.

I claim as my invention:

1. A fastener for securing together panels having adjacent edges; a pivot pin adapted to be mounted on one panel; a flat hasp member pivoted on said pin for movement in a plane substantially parallel to said panels and provided on the free end part of the member with a part offset slightly away from the panels and having rearwardly and inwardly turned side edge flanges forming guide ways extending across said adjacent edges; a flat slide member lying flat against the inner face of said free end part and having the edges slidable in said guide ways and having a projecting end portion having its free end bent toward said adjacent edges to form a wide transverse hook; a U-shaped keeper plate adapted to be mounted on the other panel and having a yoke part parallel to said edges and having its margin remote from said slide members inclined from the panels and members to form a lip; whereby said wide hook may engage the lip when the slide member telescopes to an inner locking position in said ways, and whereby said hook may clear the lip when the slide member moves to an outer unlocking position in said ways; and means carried by said members for drawing the members longitudinally together.

2. In combination, approximately alined relatively slidable superposed telescoping outer hasp member and inner slide member, one member having a hook adapted to catch on a keeper lip, the other member having a pivot end; said members being provided midway between their side edges with partially square partially registering openings having partially registering side edges, and end edges partially registering when the slide member is in inner locking position; means holding said members against pivotal movement relative to each other; a cam bolt disposed in said openings and having an outer head, a reduced inner end, and an intermediate cam body of transversely elongated cross section providing flat sides and a maximum diameter equal to the maximum transverse and longitudinal dimensions of said openings and having rounded faces coaxial with the bolt at the ends of the cross-section and engageable with side edges of the openings when the cam body is in transverse unlocking position and with end edges of the opening when the body is in locking position; and a washer fast on said reduced end larger than said openings.

3. In combination, approximately alined relatively slidable superposed telescoping hasp and slide members, the slide member having an outer end hook, the other member having a pivot end; means holding said members against pivotal movement relative to each other said members being provided with partially square partially registering openings; a cam bolt having an intermediate cam body of transversely elongated cross section engaging with side edges of the openings when the cam body is in transverse unlocking position and movable to longitudinal locking position to engage said end edges to draw the members to locking position; each opening being formed near respective diagonally opposite corners with pairs of deep and shallow shoulders disposed at substantially right angles to each other and engageable with the flat sides of the cam body to limit its movement when the body is in longitudinal position and in transverse unlocking position.

4. In combination, a pair of thick panels in the same plane meeting in a butt-joint having edge faces perpendicular to said plane and having a gasket compressed therebetween; an approximately rectangular pivot carrying plate secured fast to the face of one panel, near the joint and having side edges respectively parallel to each other and approximately perpendicular to the joint and having an approximately circular recess in one side edge having a constricted opening through said side edge; a headed pivot pin mounted fast centrally of said plate and having its head spaced from the plate; a keeper having a lip on the other panel; approximately alined relatively slidable telescoping hasp and slide members adjacent to said edge faces, the slide member having a hook engaging the keeper lip, the hasp member being pivoted to said pin; means holding said members against pivotal movement relative to each other means carried by said members drawing the members together; and a bracket bar having a rounded end fitting in said recess the bar being secured flat on the adjacent panel and having frontwardly turned end the same distance from the pivot pin as said lip, on which said hook may be locked to hold the members during shipping storing and assembly on the panels.

5. In combination, a hasp member; a slide member telescopically slidable on the inner face of the hasp member and provided with a free end hook; means holding said members against pivotal movement relative to each other said members being provided with partially square partially registering openings having side and end edges;

a cam bolt having an intermediate cam body of transversely elongated cross section engaging with side edges of the openings when the cam body is in transverse unlocking position and movable to longitudinal locking position to engage said end edges to draw the members to locking position; and the hasp member having a depression near the opening thereof; and a curved spring washer on said bolt between the hasp member and the bolt head having an elongated central opening snugly receiving said cam body, and provided with an indentation engageable in said depression to yieldably hold the bolt from rotation when the longest central diameter of the cam body is longitudinal to said member.

6. A fastener for securing together panels meeting in a butt joint, said fastener comprising a pivot pin adapted to be secured to one panel; a flat hasp member pivoted on said pin for movement parallel to said panels and provided on the free end part of the member with a part off-set slightly away from the panels and having rearwardly and inwardly turned side edge flanges forming guide ways extending across the joint; a flat slide member lying flat against the inner face of said free end part and having its edges slidably fitting in said guide ways and engaged by the flanges holding the slide member against pivotal movement relative to the hasp member and having a projecting end portion having its free end bent toward said butt joint to form a wide transverse hook; a keeper lip adapted to be attached to the other panel with which said hook may lock; said members being provided with partially registering openings; and a partially rotary bolt having an outer end head and carrying intermediate parts partially rotary in said openings and parts engageable with edges of the opening of the slide member and movable to a locking position to draw the members together to a locking position and movable to another position to extend the slide member to unlocking position.

7. A fastener for securing together panels meeting in a butt joint, said fastener comprising a pivot pin adapted to be secured to one panel; a flat hasp member pivoted on said pin for movement parallel to said panels and provided on the free end part of the member with a part off-set slightly away from the panels and having rearwardly and inwardly turned side edge flanges forming guide ways extending across the butt joint; a flat slide member lying flat against the inner face of said free end part and having its side edges slidable in said guide ways and engaged by the flanges holding the slide member against pivotal movement relative to the hasp member and having a projecting end portion having its free end bent toward said butt joint to form a wide transverse hook extending from side edge to side edge of the slide member; a keeper plate adapted to be attached to the other panel having an elongated lip with which said hook may lock; said members being provided with partially registering openings; and a partially rotary bolt having an outer end head and carrying intermediate parts rotary in said openings engageable with edges of the opening of the slide member and movable to a locking position and to an unlocking position; said intermediate parts and said openings being of such shape that when the bolt moves to locking position it will draw the members together to a locking position and when the bolt moves to unlocking position it will extend the slide member to unlocking position.

References Cited in the file of this patent

UNITED STATES PATENTS

| | | |
|---|---|---|
| 212,431 | Benson | Feb. 18, 1879 |
| 1,030,073 | Gibbs | June 18, 1912 |
| 1,503,622 | Bachmann | Aug. 5, 1924 |
| 1,517,995 | Langenau et al. | Dec. 2, 1924 |
| 2,378,654 | Pekny | June 19, 1945 |
| 2,486,686 | Shreve | Nov. 1, 1949 |

FOREIGN PATENTS

| | | |
|---|---|---|
| 740,930 | France | Feb. 3, 1933 |
| 8,279 | Great Britain | May 4, 1900 |
| 728,543 | France | Apr. 3, 1931 |